United States Patent Office 3,009,421
Patented Nov. 21, 1961

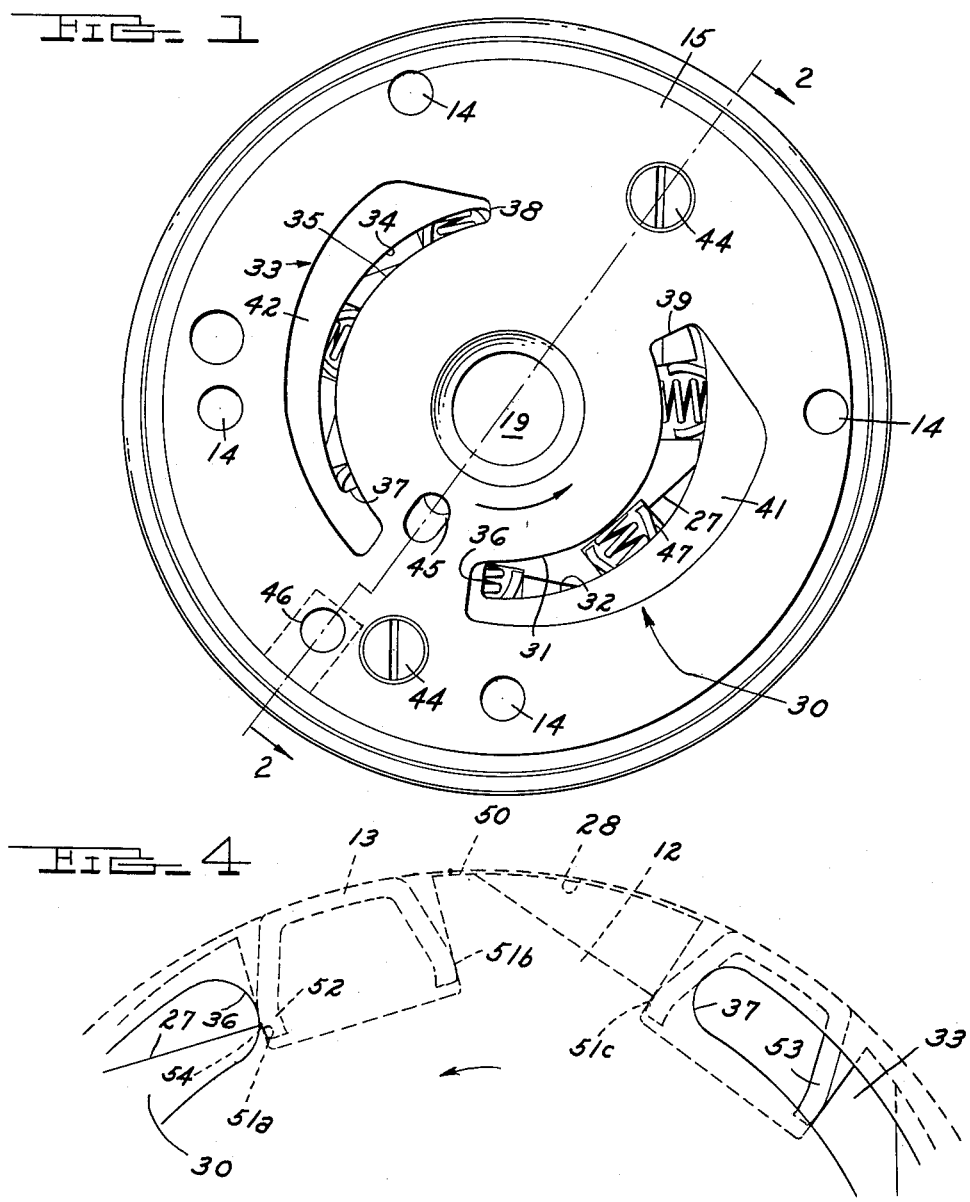

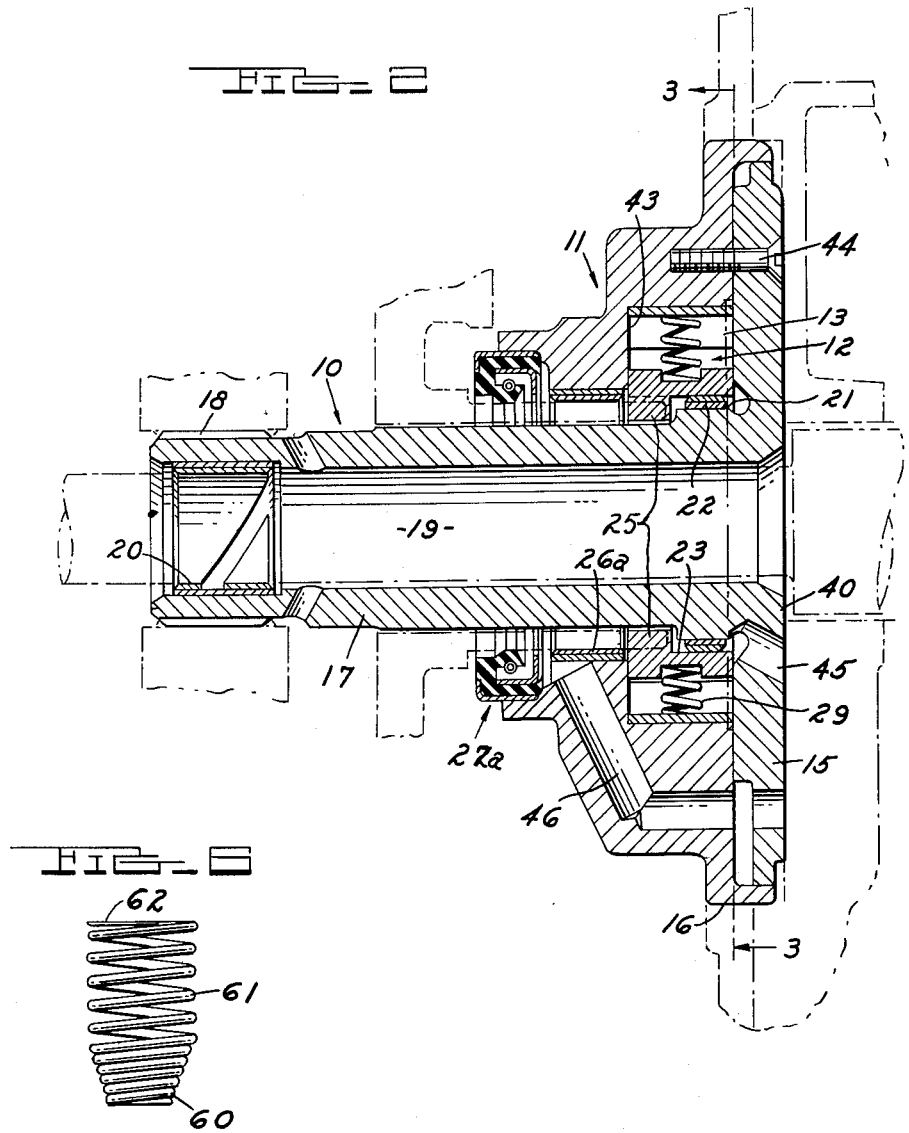

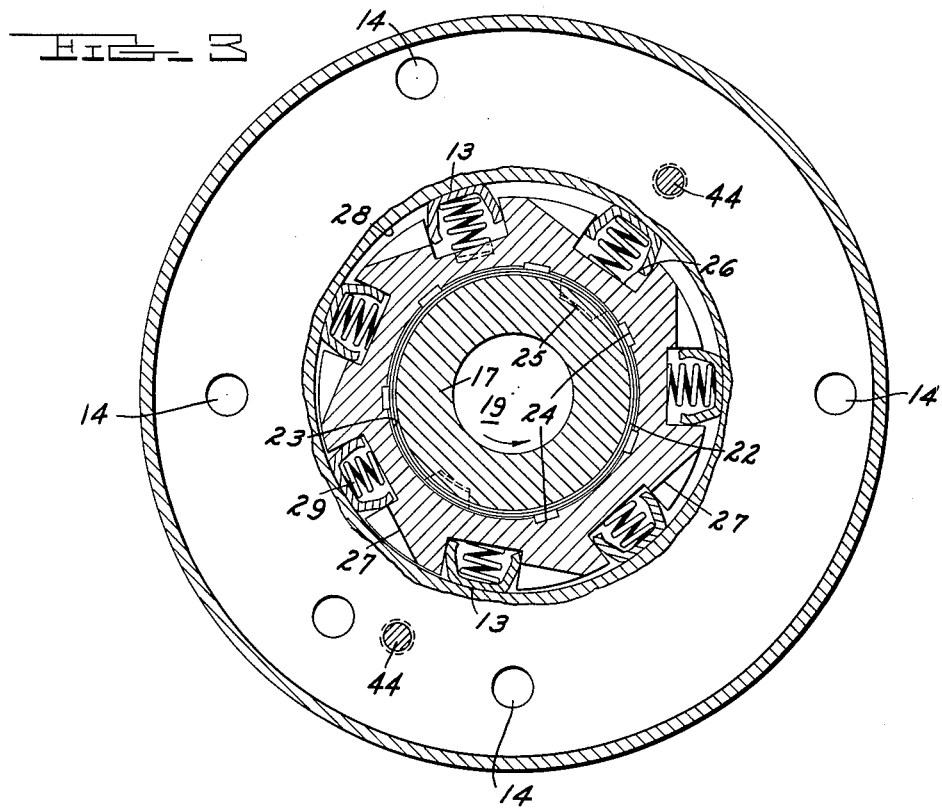
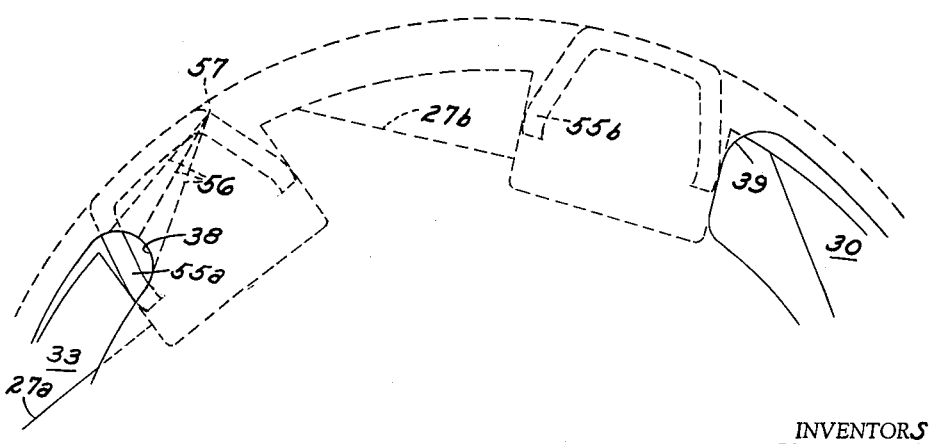

3,009,421
SLIPPER TYPE TRANSMISSION PUMP
William T. Livermore, Fort Lauderdale, Fla., and Hubert M. Clark, Birmingham, and Gilbert H. Drutchas, Detroit, Mich.; said Clark and said Drutchas assignors, by mesne assignments, to Thompson Ramo Wooldridge Inc., Cleveland, Ohio, a corporation of Ohio
Filed July 11, 1957, Ser. No. 671,300
7 Claims. (Cl. 103—135)

This invention relates to a slipper pump adapted for use in automatic transmission such as currently employed in automotive vehicles. The pumping principle is generally similar to that disclosed in issued Livermore United States Letters Patents Nos. 2,278,131; 2,333,323; 2,499,763; and 2,599,927; and copending United States patent application Serial No. 490,288 filed on February 24, 1955, all of which are characterized by relatively shallow slipper type pumping elements free to move in rotor slots both in a radial direction as required for pumping displacement and in an angular rocking direction such as to permit the outer slipper face to maintain a surface area contact with the pump bore in which the rotor operates.

The main object of the present invention is to adapt such pumping principle to meet the requirements of an automatic transmission pump in a manner such as to provide substantial economies in production, cost and space for given volume capacity as compared to present type gear pumps currently in use for this purpose.

Another object is to render such pump quiet in operation.

Another object is to render such pump durable and free of operational service requirements.

Another object is to provide a simplified construction wherein the rotor is peg mounted on a single radial bearing within the axial limits of the working chamber.

Another object is to also incorporate a driving connection for the rotor within the axial limits of the working chamber.

Another object is to provide a slipper seal construction as distinguished from a rotor seal between the inlet and outlet ports eliminating the necessity for accurate radial tolerances in locating the rotor relative to the pump bore.

Another object is to adapt such slipper seal to operate in a construction employing a circular pump chamber bore.

Another object is to provide for side-porting the inlet arc to the pumping displacement space under the slippers in order to minimize problems of cavatation arising from centrifugal forces. Another object is to provide auxiliary means for filling the slipper chamber radially past the leading edge of each slipper to facilitate complete filling and thereby assure quietness of operation.

Another object is to employ sheet metal slipper construction which may be readily stamped or roll-formed into a simple U-section channel shape.

Another object is to provide a construction employing a minimum number of accurate dimensional tolerances and separate machining operations.

These and other objects will be more apparent from the following detailed description of a particular preferred embodiment of the present pump construction adapted to meet requirements for an automatic transmission front pump located adjacent the torque converter assembly wherein:

FIGURE 1 is an end elevation of the pump assembly taken in a forwardly direction of the transmission and showing the inlet and outlet porting relative to the rotor and slippers;

FIGURE 2 is a sectional elevation taken through the axis of the pump along the line 2—2 of FIGURE 1 which corresponds to the center line of eccentricity between the pump rotor and bore;

FIGURE 3 is a sectional end elevation taken along the line 3—3 of FIGURE 2;

FIGURE 4 is an enlarged fragmentary end elevation of the sealing arc area of the pump showing the relationship of rotor, slippers, inlet and outlet ports;

FIGURE 5 is a similar view of the working arc areas of the pump; and

FIGURE 6 is a side elevation of a preferred slipper spring construction.

Referring to FIGURE 2, the principal components of the pump include a converter support assembly 10, a housing assembly 11, a rotor assembly 12, and slipper pump elements 13. The converter support assembly 10 is assembled to the housing assembly 11 by two machine screws 44. The complete pump assembly as shown is adapted for attachment to the forward wall of the transmission housing by bolts passing through four bolt holes 14 extending through the housing assembly 11 and header flange 15 of the converter support assembly 10, the outer perimeter 16 of the housing assembly being piloted within the front face of the transmission case and the stem 17 being adapted to support the torque converter assembly and through splines 18 to hold the reaction element for the stator assembly of the torque converter (shown in phantom), all as conventional in prior gear pump assemblies. As is also conventional, stem 17 has an axial passage 19 for the transmission drive shaft (shown in phantom) piloted in bearing 20 and driven by the turbine of the torque converter. Concentric with the bearing 20, the stem 17 is provided with an annular shoulder 21 which supports rotor bearing 22 within the cylindrical rotor bore 23 extending somewhat more than halfway through the rotor. As best shown in FIGURES 2 and 3, a pair of inwardly projecting rotor lugs 25 are adapted for drive engagement with the grooved end of a driving sleeve extending through bearing 26a and seal assembly 22a to the engine driven impeller of the torque converter (shown in phantom) and thus the rotor is in turn driven at engine speed.

Seven U-shaped sheet metal slippers 13 are carried on a like number of equally spaced slots 26 extending axially across the outer perimeter of the rotor, the leading corner of the rotor adjacent each of the slots being relieved down to the notch surface 27 extending from the face of the rotor (in the plane of FIGURE 3) substantially to the center plane of the rotor. The slipper leg surfaces which engage the side walls of the rotor slots 26 are preferably formed with circular arcs of a common circle having a diameter substantially equal to the width of the slipper to provide a nominal working clearance within the side walls of the rotor slot in the order of 2 to 7/1000 of an inch whereby the slipper may be free to rock as it moves radially in the slot in order that its outer face may freely follow the contour of the circular bore 28 in the housing 11, the outer face of the slipper being formed with a radius almost equal to that of such bore so that area contact over substantially the entire width of the outer face of the slipper is maintained with the bore throughout its travel. A spring 29 seated in a pocket at the bottom of each slot urges each slipper outwardly into face contact with the bore which is also maintained by centrifugal force on the slipper during pumping operation.

As best shown in FIGURE 1, an inlet port 30 extending through the header flange 15 to the adjacent face of rotor 12 is defined by an inner circular arc 31 having a center on the axis of rotor rotation and a radius corresponding substantially to the radial location of the bottom of the rotor slots, and by an outer circular arc 32 concentric with the circular bore 28 in the housing and having a radius slightly less than that of said bore (in the order of $50/1000$ of an inch as compared with typical slipper stock of $60/1000$ of an inch) so as to provide a guide rail to confine each slipper against axial displacement during its movement through the intake arc without in any way restricting said flow to fill the slipper slot. The outlet port 33 is defined by an outer circular arc 34 which is a continuation of the corresponding arc 32 of the inlet port and thus bears the same relation to the bore 28, and by an inner circular arc 35 concentric with the outer arc 34 leaving an outlet port opening somewhat narrower than the depth of a slipper.

The terminal edge 36 of the inlet port is spaced approximately 28° from the center line of the bore, the terminal edge 37 of the outlet port approximately 56° from the terminal edge 36, the terminal edge 38 of the outlet port 111° from the edge 37, and the edge 39 180° from the edge 37 in the typical case illustrated. The critical relationship of these terminal edges relative to adjacent slippers passing between ports in the working and nonworking arcs is best illustrated in FIGURES 4 and 5 as hereinafter described in detail.

The outer face 40 of the header flange 15 is cored out in the areas indicated at 41 and 42 to a partial depth leading respectively to the outer perimeters of the port boundaries 32 and 34 just described, in order to facilitate flow to and from such ports through the relatively larger port apertures in the adjacent transmission wall, not shown.

The bore 28 extends to a depth terminating in the pumping chamber face 43 only slightly greater than the width of the rotor (in the order of 1½ to 2½/1000 of an inch clearance) and the slipper (2 to ¾₁₀₀₀ of an inch clearance) for running clearance. Any leakage radially inwardly past the rotor is drained through exhaust passage 45 or 46.

In operation as the slippers advance into the intake arc 30 oil flows laterally through the open end of the slipper to progressively fill the slot under the slipper as it moves radially outwardly and as the leading edge of slipper leg 47 moves radially past the adjacent edge of the rotor notch surface 27, oil may also enter the slipper slot under such leading edge, thereby assuring complete filling even under high speed operation. The provision of such auxiliary filling path has been found very desirable for high speed operation not only to prevent cavitation in filling but to assure that each slipper will continue to follow the circular bore against which it rides throughout all portions of the intake arc, a tendency having been noticed in the absence of such auxiliary filling path for slippers to momentarily hang back in their slots leaving contact with the circular bore, thereafter restoring contact abruptly with a noise and wear producing effect.

With reference to the enlarged views illustrating the relationship of adjacent slippers in the working and sealing arcs, it will be seen that in the sealing arc as shown in FIGURE 4 there may be a substantial clearance 50 between the rotor 12 and the bore 28 which in the absence of slipper sealing would provide a direct flow path between the outlet port 33 and inlet port 30. It will also be seen that at least one complete slipper 13, or portions of two adjacent slippers which are the equivalent of at least one complete slipper, always provides a seal against flow directly between outlet and inlet ports. Thus, at the moment shown, three sealing lines (51a, 51b and 51c) between the slipper legs and the rotor are interposed between the respective inlet and outlet ports and it will be seen that even after slipper leg 52 has moved past the terminal edge 36 of the inlet port, sealing lines 51b and 51c will remain effective until after slipper leg 53 has passed the terminal edge 37 of the outlet port. It will also be noted that as the following slipper closes off completely from the outlet port 33, it is filled internally with high pressure acting against the internal surfaces of the legs in a manner tending to spread them apart, and that as soon as the trailing leg of the leading slipper moves past the terminal edge 36 of the inlet port 30, pressure on the outside of the leading leg of the following slipper will be relieved whereby the higher internal pressure sustained by decreasing internal volume as the slipper approaches the center line of the bore will tend to reduce any clearance with the rotor slot wall at the sealing edge 51c or corresponding sealing edge of the leg 53. It will also be seen that while initial filling of the rotor slot under the leading slipper will take place through the open end of the slipper, as soon as the radial displacement of such leading slipper causes the leading edge to break contact with the edge 54 of the relieved rotor notch surface 27, supplemental filling will take place under the edge of leg 52.

Referring to FIGURE 5, showing the corresponding relationship of adjacent slippers moving between terminal edge 39 of the inlet port 30 and opening edge 38 of the outlet port 33, it will be seen that again a minimum of at least one slipper, or its equivalent, is always interposed between the respective ports. In this case, however, the leading legs 55a and 55b do not provide sealing contact with the rotor due to their radial displacement relative to the level of rotor surfaces 27a and 27b. In order to provide for a gradual transition from low pressure to high pressure on the oil between adjacent slippers, a shallow tapered V-notch 56 is provided on the inner surface of the header extending from the outlet port 33 back to the point 57, such point is uncovered just after the inlet port 30 is completely sealed off by the following slipper, as shown.

As shown in FIGURE 1, the adjacent terminal and opening edges of the respective inlet and outlet ports are approximately symmetrically arranged relative to the center line of eccentricity between the bore and rotor. This arrangement, together with an odd number of slippers, minimizes fluctuations in inlet and outlet flow. This may best be understood by considering the effect of eccentricity between the rotor and bore within the respective working and sealing arcs on the instantaneous rate of pumping. As a given slipper passes through the working arc it delivers a column of oil ahead of the slipper to the outlet port at a rate which increases as the slipper approaches the center line of eccentricity (due to the radially outward movement of the slipper increasing the instantaneous effective area of such column of oil engaged by the slipper) and at a rate which decreases as the slipper is displaced radially inwardly after passing such center line. On the other hand, as a given slipper passes through the sealing arc, a column of oil follows such slipper resulting in negative pumping at a rate which decreases as the slipper approaches the center line of eccentricity and increases as the slipper is displaced radially outwardly after passing such center line. The net instantaneous rate of outlet flow at any given moment will be the difference between the instantaneous positive and negative rates of pumping as determined by the relative positions of effective slippers in the respective working and sealing arcs. If the effective area of a slipper in the working arc reached a maximum at the same time that the effective area of a slipper in the sealing arc reached a minimum, a maximum fluctuation in the net rate of outlet flow would occur. This may be illustrated by representing the fluctuations in instantaneous positive pumping rates at a series of points as a slipper in the working arc approaches and leaves the center line of eccentricity by the number series 1, 2, 3, 2, 1, while representing the corresponding fluctuations in instantaneous negative pumping rates as a slipper in the sealing arc approaches and leaves the center line of eccentricity by the number series 3, 2, 1, 2, 3. Assigning plus and minus values to the respective number series, the net fluctuation would be represented by the number series —2, 0, +2, 0, —2. However, if the phasing of working and sealing slippers is shifted so that their effective areas reach a maximum at the same time, the net fluctuation would be represented by the number series 0, 0, 0, 0, 0. By so arranging the ports and slipper spacing that an increasing instantaneous rate of negative pumping occurs simultaneously with and is substantially balanced or counteracted in change of flow rate by an increasing instantaneous rate of positive pumping, the respective fluctuations in pumping and negative pumping rates arising from eccentricity in the working and sealing arcs can be substantially offset and cancelled out. With an odd number of slippers, as shown, the respective pumping and sealing slippers reach the center line of eccentricity in an out-of-phase relation, and in order to minimize fluctuations in the net effective pumping rate, approximately symmetrical porting has been employed. If an even number of slippers are employed, a similar effect can be produced by a nonsymmetrical port spacing wherein simultaneous increasing (or decreasing) rates of pumping and negative pumping substantially offset each other.

Referring to FIGURE 6, the preferred slipper spring construction is characterized by a tapered conical section 60 adapted to freely extend within the slipper legs and having a number of closely wound inactive coils to add mass and rigidity to this portion of the spring, relatively large diameter active coils 61 for lateral stiffness, and a minimum portion of an inactive coil consistent with stable seating at the rotor engaging end 62. It has been found in high speed testing of transmission pumps of the construction disclosed herein that a critical relationship may be encountered between the expanding force stored in the spring through compression, the opposing centrifugal force acting on the spring coils tending to assist compression and resist expansion of the same, together with the accelerating force required to overcome inertia in expanding the spring from its minimum to maximum length in passing from the sealing arc to the working arc of the pump which, if neglected, may cause the springs to leave their rotor pockets and become displaced from operating position. Thus if a plurality of inactive coils are employed at the rotor end of the spring, their added mass aggravates the problem incident to centrifugal and inertial forces, while inactive coils at the slipper end of the spring have no such aggravating effect but assist proper operation of the spring through adding mass and frictional resistance to lateral displacement at the slipper contact surface as well as rigidity against lateral buckling. The tapered conical form for such slipper end assures end loading within the spring base for all slipper positions and also permits a larger active coil diameter, both of which contribute to lateral stability against buckling.

While a particular preferred embodiment of the present invention has been described above in detail, it will be understood that numerous changes might be resorted to without departing from the scope of the invention as defined in the following claims.

We claim:

1. A slipper type pump having a circular pump bore, a circular rotor mounted eccentrically in said bore providing a crescent chamber therebetween, slots in said rotor, slippers carried in said slots adapted to engage said bore throughout successive portions of said crescent chamber corresponding to a sealing arc including minimum spacing between rotor and bore, an inlet arc of increasing spacing, a working arc including maximum spacing and an outlet arc of decreasing spacing, and inlet and outlet ports communicating respectively with the inlet and outlet arc portions of said crescent chamber; characterized by each slipper being formed with a uniform channel cross section extending throughout its entire length providing fully open channel ends, the radially outward base of said channel being formed with substantially bore curvature for pressure sealing engagement with said bore adapted to establish through circumferential arc spanning contact with said bore the angular as well as radial position of said slipper in its rotor slot, one radially inwardly extending leg of said channel being adapted to maintain driving and pressure sealing contact with said rotor, the other radially inwardly extending leg of said channel being adapted to limit circumferential displacement of said slipper in its slot, said inlet and outlet ports overlapping the exterior and interior portions of said channel formed slipper ends to provide direct communication with the rotor slot inside each channel formed slipper as well as with the respective inlet and outlet arc portions of said crescent chamber.

2. A slipper type pump as set forth in claim 1 including end plates in generally sealing relationship with the ends of said rotor and slippers, and at least one of said end plates including angularly spaced inlet and outlet ports radially located to provide said direct communication across the open ends of said slippers during their travel through the respective inlet and outlet arc portions of said crescent chamber.

3. A slipper type pump as set forth in claim 2 wherein each channel slipper and slot forms a substantially open flow path therebetween when said slipper is in its radially innermost position, and wherein the leading edge of each rotor slot is relieved with a notch extending through a limited portion of its length to provide an auxiliary flow path communicating between said crescent chamber and the slot under each slipper.

4. A slipper type pump as set forth in claim 2 wherein each channel slipper and slot forms a substantially open flow path therebetween when said slipper is in its radially innermost position, and wherein the leading edge of each rotor slot is relieved with a notch extending through a limited portion of its length to provide an auxiliary flow path communicating between said crescent chamber and the slot under each slipper, said relieved notch portion being of limited depth to accommodate sealing between the leading slipper leg and said rotor throughout a portion of the slipper's travel when the rotor is relatively close to the bore.

5. A slipper type pump as set forth in claim 1 wherein said slippers are provided with wall thickness dimensions rendering them yieldable to expansion through internal pressure to reduce sealing clearance between rotor slot and slipper legs in passing through an arc where a portion of this slipper is subjected to a substantially lower external than internal pressure.

6. A slipper type pump as set forth in claim 2 wherein said ports are limited in their opening to leave guide means for the ends of said slippers in passing through said inlet and outlet arcs without substantially restricting flow.

7. A slipper type pump as set forth in claim 1 further characterized by springs reacting between slippers and rotor, each spring having a plurality of inactive coils at the slipper contact end and a rotor contact end relatively free of inactive coils.

References Cited in the file of this patent

UNITED STATES PATENTS 319,093    Hassinger _____ June 2, 1885

(Other references on following page)

UNITED STATES PATENTS

| | | | |
|---|---|---|---|
| 892,443 | Ostrander | July 7, | 1908 |
| 1,079,011 | Kaessmann | Nov. 18, | 1913 |
| 1,245,691 | Deysher | Nov. 6, | 1917 |
| 1,912,093 | Parson | May 30, | 1933 |
| 2,225,803 | Smith | Dec. 24, | 1940 |
| 2,275,774 | Kraissl | Mar. 10, | 1942 |
| 2,333,323 | Livermore | Nov. 2, | 1943 |
| 2,499,763 | Livermore | Mar. 7, | 1950 |
| 2,688,924 | Links | Sept. 14, | 1954 |

FOREIGN PATENTS

| | | | |
|---|---|---|---|
| 110,165 | Switzerland | May 16, | 1925 |
| 283,961 | Germany | Apr. 28, | 1915 |
| 414,965 | Germany | June 16, | 1925 |
| 469,883 | Great Britain | Aug. 3, | 1937 |
| 571,151 | France | Jan. 28, | 1924 |
| 743,191 | Germany | Dec. 20, | 1943 |
| 855,741 | France | Feb. 19, | 1940 |